(12) United States Patent  
Tajima et al.

(10) Patent No.: US 6,746,048 B2
(45) Date of Patent: Jun. 8, 2004

(54) BUCKLE APPARATUS FOR SEAT BELT SYSTEM

(75) Inventors: Masaya Tajima, Aichi-ken (JP);
Takayuki Hara, Aichi-ken (JP);
Tetsushi Muromachi, Aichi-ken (JP);
Teruhiko Koide, Aichi-ken (JP);
Hitoshi Muraki, Aichi-ken (JP);
Kouichi Itoigawa, Aichi-ken (JP);
Masakata Kanbe, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 12 days.

(21) Appl. No.: 10/285,661

(22) Filed: Nov. 1, 2002

(65) Prior Publication Data

US 2003/0111836 A1 Jun. 19, 2003

(30) Foreign Application Priority Data

Nov. 2, 2001 (JP) ........................................ 2001-337411

(51) Int. Cl.⁷ .............................................. B60R 22/18
(52) U.S. Cl. ...................... 280/801.1; 24/641; 280/735
(58) Field of Search .............................. 280/801.1, 808, 280/735; 24/641, 633, 640, 642, 637; 297/468, 470

(56) References Cited

U.S. PATENT DOCUMENTS

| 6,081,759 | A  | * | 6/2000  | Husby et al. ............... 701/45 |
| 6,082,481 | A  | * | 7/2000  | Engler ...................... 180/268 |
| 6,209,915 | B1 |   | 4/2001  | Blakesley |
| 6,230,088 | B1 |   | 5/2001  | Husby |
| 6,647,811 | B2 | * | 11/2003 | Blakesley et al. ..... 73/862.391 |

FOREIGN PATENT DOCUMENTS

| JP | 52-103683 | 8/1977 |
| WO | 99/27337  | 6/1999 |

* cited by examiner

Primary Examiner—Paul N. Dickson
Assistant Examiner—Faye M. Fleming
(74) Attorney, Agent, or Firm—Nixon Peabody, LLP

(57) ABSTRACT

A plate spring urges a base of a buckle device toward an anchor insertion opening side with respect to an anchor plate. Provided that urging force of the plate spring exceeds urging force of a spiral spring, the base is held, by the urging force of the plate spring, at a position at which a rivet contacts an insertion direction side end portion of a long hole. However, when the urging force of the spiral spring exceeds the urging force of the plate spring due to, in order to attach a child seat, pulling out of a webbing belt more than at a time when a body is to be restrained, the base moves against the urging force of the plate spring, and the plate spring pushes a transfer rod. Due to this pushing force being detected by a semiconductor diffusion strain gauge, it can be detected that the child seat is attached on a seat.

12 Claims, 7 Drawing Sheets

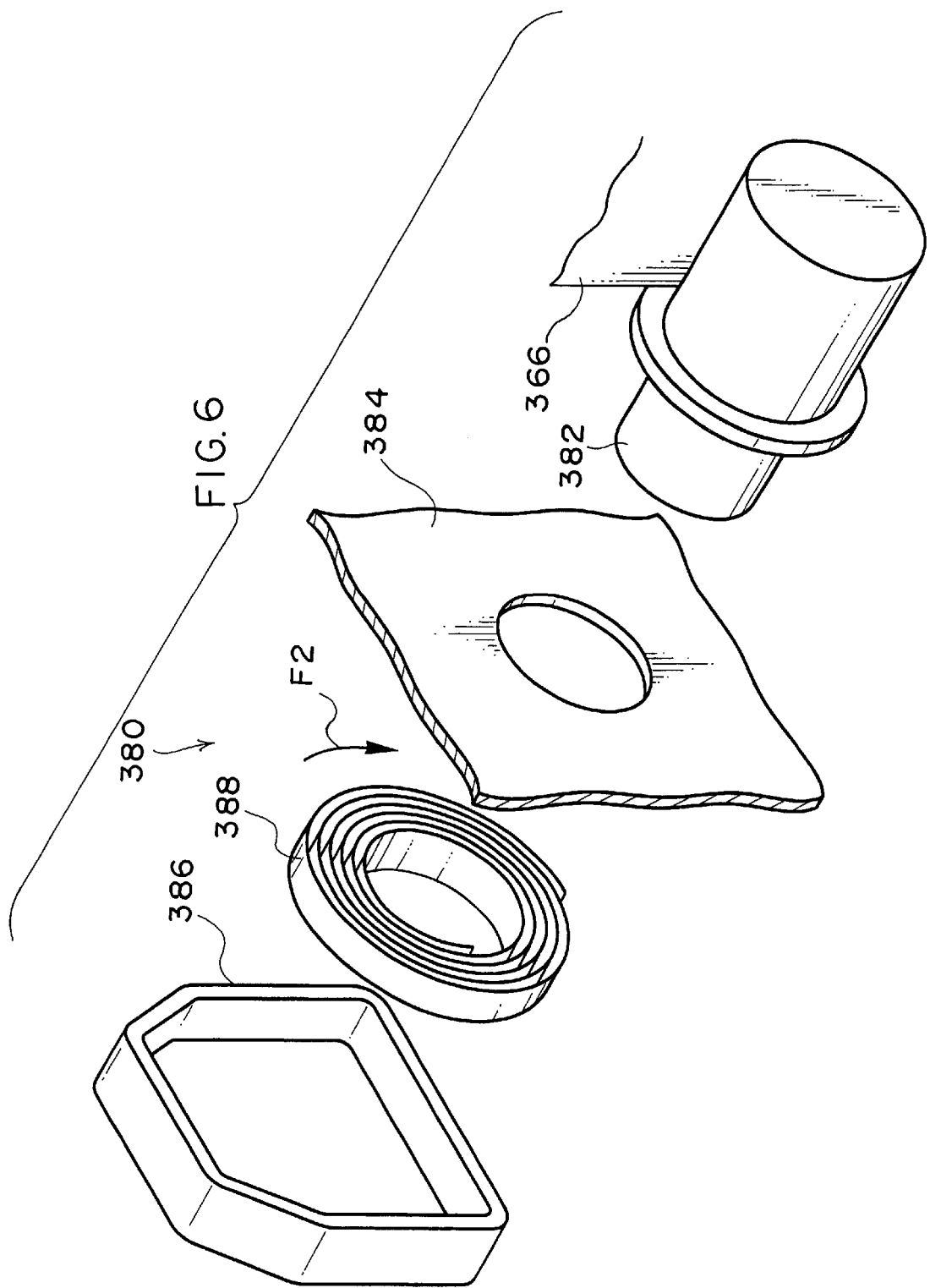

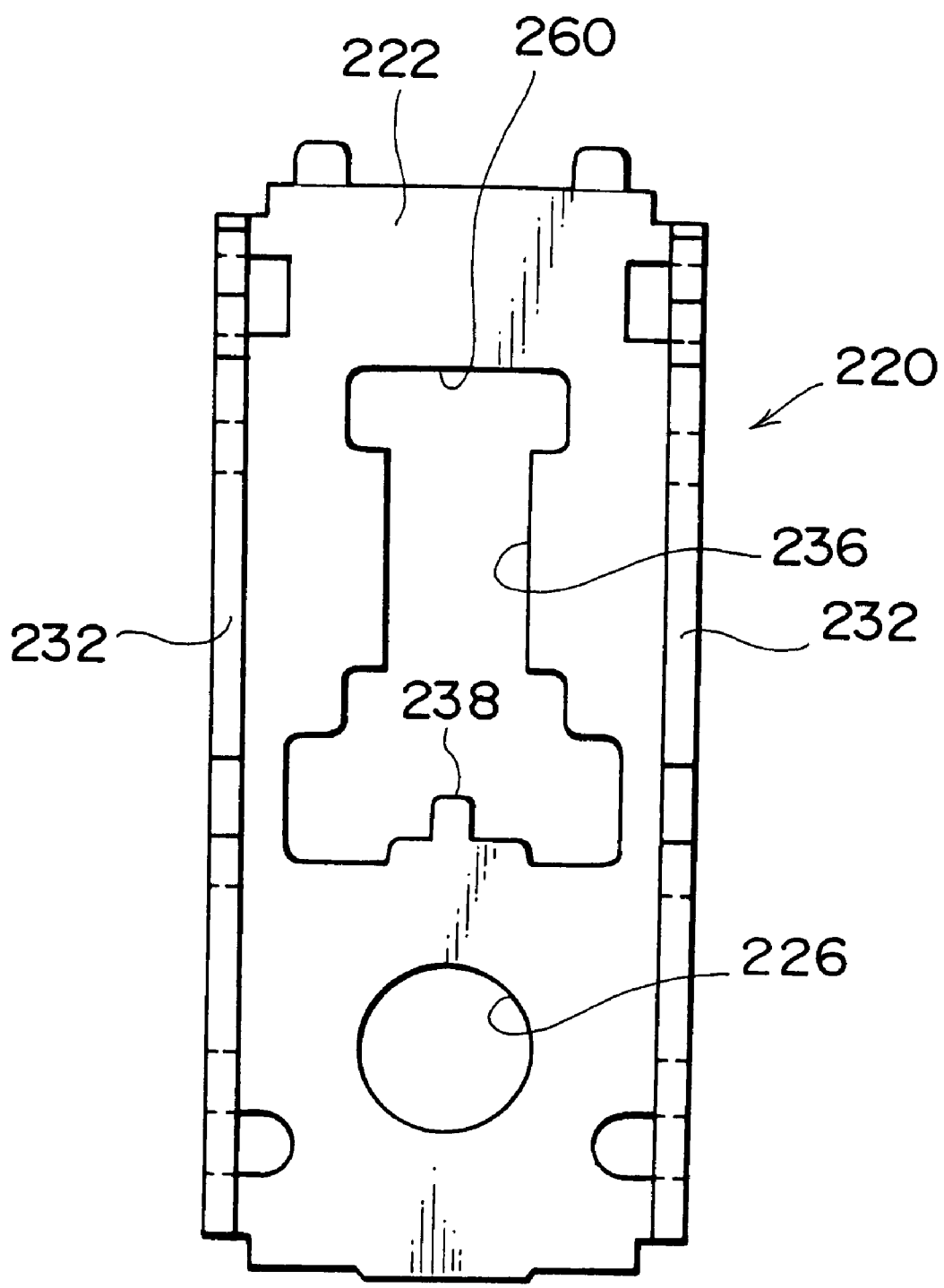

BUCKLE APPARATUS FOR SEAT BELT SYSTEM

BACKGROUND OF THE INVENTION

1. Technical Field

The present invention relates to a buckle device for holding a webbing belt in a state in which the webbing belt restrains the body of a vehicle occupant, in a seat belt device of a vehicle.

2. Background Technology

The proximal end of a webbing belt, which forms a seat belt device for restraining the body of a vehicle occupant seated in a seat of avehicle, is anchored on the take-up shaft of a retractor provided, for example, at the side of the seat. In contrast, the distal end of the webbing belt is fixed to an anchor plate provided in a vicinity of the retractor.

Further, an intermediate portion of the webbing belt in the longitudinal direction thereof passes through an insert-through hole formed in a through-anchor above the retractor, e.g., at an upper end side of the center pillar of the vehicle, and is folded back downwardly.

The webbing belt between the portion folded over at the through-anchor and the other end passes through an insert-through hole of a tongue plate. Accordingly, due to the tongue plate being pulled, the webbing belt, which is taken-up on the take-up shaft of the retractor, is pulled out. In the state in which the webbing belt is pulled-out in this way, by connecting the tongue plate to a buckle device, which is provided at the side of the seat opposite the side at which the retractor is provided, the webbing belt is set in an applied state.

On the other hand, when an infant or a child who has not yet reached a given age rides in a vehicle, a so-called child seat must be attached to the vehicle, and the infant or child must ride in the child seat.

As a structure for attaching this type of child seat to the vehicle, there is a structure in which the child seat is placed on the seat, and which fixes the child seat by the webbing belt being engaged with and connected to the child seat and the tongue plate being connected to the buckle device as described above.

However, in vehicles of recent years, in addition to the above-described seat belt device, a so-called air bag device is mounted which, at the time when the vehicle rapidly decelerates, expands and unfolds a bag body at the front side of the vehicle occupant such that the vehicle occupant, who attempts to move toward the front of the vehicle due to the inertia at the time of the rapid deceleration of the vehicle, is caught by the bag body. In a vehicle in which this type of air bag device is mounted, when a child seat is attached onto the seat, it is preferable to make the air bag device, which corresponds to that seat, not operate.

As a mechanism for making the air bag device not operate when a child seat is attached, there is a method in which a load sensor is mounted to a vehicle seat, and which, on the basis of the load applied to the seat, judges whether a general vehicle occupant is seated on the seat or a child seat is attached, and which controls the air bag device on the basis of the results of judgement.

However, there is a great dispersion of body weights of vehicle occupants who sit on the seat. Thus, in a method which judges whether or not a child seat is attached on the basis of the load applied to the seat, it is difficult to set a threshold value which becomes the criterion for this judgement.

Further, a method has been thought of in which a device for detecting a child seat is provided separately at the vehicle, and which reliably detects and judges whether or not a child seat is mounted. However, it is difficult to newly provide a special device within the extremely limited space within the vehicle interior, and the costs of requiring a new vehicle design and the like increase. Thus, it is desirable to add a mechanism which can reliably detect whether a child seat is or is not attached, to an existing device or member such as the above-described buckle device or the like.

In view of the aforementioned, an object of the present invention is to provide a buckle device which enables various detections which are based on the pulling-out of the webbing belt, such as the attachment of a child seat or the like.

SUMMARY OF THE INVENTION

In order to achieve the above-described object, the present invention recited in claim 1 is a buckle device holding a tongue plate mounted to an elongated, strip-shaped webbing belt which is taken-up and accommodated from a proximal end side toward an accommodating direction side which is opposite to a pull-out direction, by an accommodating urging force which increases and decreases in accordance with an amount by which the webbing belt is pulledout toward a pull-out direction side, said buckle device comprising: a device main body into which the tongue plate is inserted from a distal end side; a latch which is provided at the device main body so as to be movable so as to approach and move away from the tongue plate inserted in the device main body, and which, by moving to approach the tongue plate, mechanically engages with the tongue plate, and limits movement of the tongue plate in a separating direction which is opposite to an insertion direction into the device main body; an anchor member which is mounted to a predetermined position of a vehicle, and which supports the device main body such that the device main body is relatively movable in a predetermined range in the insertion direction and the separating direction; urging means for urging the device main body in the insertion direction with respect to the anchor member, by urging force which is greater than the accommodating urging force in a state in which the webbing belt is pulled out by a predetermined length; a force sensor which is mounted to one of the anchor member and the device main body, and which outputs a load detection signal which is based on pushing force applied from one of the insertion direction and the separating direction; and a pushing member applying pushing force to the force sensor in accordance with relative movement of the device main body in the separating direction with respect to the anchor member.

The present invention recited in claim 2 has the feature that, in the buckle device recited in claim 1, the force sensor has a strain gauge whose electrical resistance value varies in accordance with application of external force and cancellation of applied external force, and, on the basis of a change in the electrical resistance value, the force sensor detects one of that the pushing force is applied and that application of the pushing force is cancelled.

The present invention recited in claim 3 has the feature that, in the buckle device recited in claim 2, the force sensor has: a case accommodating a diaphragm to which the strain gauge is mounted; and a transfer rod whose proximal end contacts the diaphragm, and whose other end side projects from a hole formed in a side wall of the case, and which receives the pushing force at an exterior of the case, and the transfer rod, which has received the pushing force, one of pushes the strain gauge directly and pushes the strain gauge indirectly via the diaphragm.

The present invention recited in claim 4 has the feature that, in the buckle device recited in claim 3, the force sensor has a gel-like sealing means which is provided at an interior of the case and which seals the strain gauge at an interior.

The present invention recited in claim 5 has the feature that, in the buckle device recited in claim 4, a plate spring is the urging means and the pushing member, and the plate spring is structured so as to include: a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

The present invention recited in claim 6 has the feature that the buckle device recited in claim 5 further comprises a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

The present invention recited in claim 7 has the feature that, in the buckle device recited in claim 1, a plate spring is the urging means and the pushing member, and the plate spring is structured so as to include: a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

The present invention recited in claim 8 has the feature that the buckle device recited in claim 7 further comprises a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

The present invention recited in claim 9 has the feature that, in the buckle device recited in claim 2, a plate spring is the urging means and the pushing member, and the plate spring is structured so as to include: a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

The present invention recited in claim 10 has the feature that the buckle device recited in claim 9 further comprises a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

The present invention recited in claim 11 has the feature that, in the buckle device recited in claim 3, a plate spring is the urging means and the pushing member, and the plate spring is structured so as to include: a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

The present invention recited in claim 12 has the feature that the buckle device recited in claim 11 further comprises a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

In the buckle device recited in claim 1, the tongue plate which is attached to the elongated, strip-shaped webbing belt is inserted into the device main body from the distal end side of the tongue plate. In this state, due to the latch approaching the tongue plate and mechanically engaging with the tongue plate, the tongue plate and the device main body are mechanically connected. In this way, movement of the tongue plate in the separating direction at the time when the tongue plate is removed from the device main body is restricted.

Accordingly, in this state in which movement is restricted by the latch, if the webbing belt is made to span across the front side of the body of a vehicle occupant seated on the seat, a webbing belt applied state arises, and the body of the vehicle occupant is restrained by the webbing belt.

On the other hand, the above-described webbing belt is urged toward the accommodating direction side (i.e., toward the proximal end side of the webbing belt) by a predetermined accommodating urging force. Accordingly, in the state in which tension (tensile force) based on the accommodating urging force is applied to the webbing belt and the tongue plate is inserted in the device main body, this tension attempts to remove the tongue plate from the device main body.

Here, the device main body is connected so as to be movable over a predetermined range in the insertion direction and the separating direction of the tongue plate, with respect to the anchor member which connects the device main body to the vehicle. Thus, when the aforementioned tension is applied to the latch which engages with the tongue plate via the tongue plate which is inserted in the device main body, the device main body attempts to move in the separating direction with respect to the anchor member via the latch.

However, because the device main body is urged in the insertion direction by the urging means, provided that tension exceeding the urging force of the urging means, i.e., accommodating urging force at the time the webbing belt is pulled out by a predetermined length or more, is not applied, the device main body cannot be moved in the separating direction with respect to the anchor member.

On the other hand, when tension (i.e., accommodating urging force) against the urging force of the urging means is applied to the webbing belt, and the device main body thereby moves toward the separating direction side with respect to the anchor member, the pushing member pushes the force sensor in accordance with this movement. A load detection signal of a predetermined level is outputted from the force sensor which has received the pushing force in this way.

As described above, in order for the device main body to move toward the separating direction with respect to the anchor member, the accommodating urging force which resists the urging force of the urging means must be applied to the webbing belt. In order for the accommodating urging force which resists the urging force of the urging means to be applied to the webbing belt, the webbing belt must be pulled out by a predetermined length or more.

Thus, as described above, due to the force sensor being pushed by the pushing member, it can be detected that the webbing belt has been pulled out by a predetermined length or more.

Accordingly, for example, by making the urging force of the urging means be greater than the accommodating urging force corresponding to the pulled-out amount of the webbing belt needed to restrain the body of a vehicle occupant seated on the seat, and making the urging force of the urging means be smaller than the accommodating urging force corresponding to the pulled-out amount of the webbing belt needed to fix a child seat on the seat, it can be detected whether or not a child seat is attached on the seat.

Note that, as described above, detection of a child seat is given as one example of an applied example of the present invention. However, it is to be additionally remarked that the present invention is not limited to the detection of a child seat.

In the buckle device recited in claim 2, when the urging force of the urging means exceeds the accommodating urging force and the device main body moves in the separating direction with respect to the anchor member, the pushing force from the pushing member is applied either directly or indirectly to the strain gauge of the force sensor. The strain gauge to which the pushing force is applied deforms slightly, and the electrical resistance value changes due to this deformation. Accordingly, by detecting the change in the electrical resistance value of the strain gauge, it can be detected whether or not the device main body has moved relative to the anchor member, i.e., whether or not the webbing belt has been pulled out by a predetermined length or more.

Here, the electrical resistance value of the strain gauge generally varies linearly with respect to changes in the pushing force applied to the strain gauge. Thus, the pulled-out amount of the webbing belt can be detected if it is a predetermined length or more. In this way, for example, it can be applied not only to detection of a child seat, but also to various types of controls and the like such as control of a so-called pretensioner mechanism or a force limiter or the like, and further, it can be used in a plurality of different controls.

Note that the strain gauge in the present invention is a generic term for elements which utilize the piezoresistance effect which is the fact that, when strain is applied to a resistor which is metal or a semiconductor, the resistance value changes, and which convert a physical amount such as pressure or load or the like into an electric signal. Examples thereof are metal strain gauges, semiconductor strain gauges, and the like. As semiconductor strain gauges, there are a diffusion type, a bulk type, a deposition type, and the like. However, the strain gauge in the present invention is not limited to any of these various types of strain gauges, and it does not matter if the strain gauge is appropriately selected on the basis of the structure of the entirety of or the respective regions of the buckle device.

In the buckle device recited in claim 3, the distal end side of the transfer rod passes through and projects out from a hole formed in the side wall of the case. When the urging force of the urging means exceeds the accommodating urging force and the device main body moves in the separating direction with respect to the anchor member, pushing force is applied to the distal end of the transfer rod, and the pushing force attempts to push the transfer rod into the interior of the case.

The proximal end of the transfer rod contacts the diaphragm accommodated in the case. When pushing force is received as described above, the diaphragm is pushed by the transfer rod. In this way, the diaphragm deforms slightly. Because the strain gauge is mounted to the diaphragm, when the diaphragm deforms as described above, the strain gauge also deforms. In this way, the electrical resistance value of the strain gauge varies.

In the buckle device recited in claim 4, the strain gauge is sealed in the gel-like sealing means. Thus, foreign matter such as dust and the like does not adhere to the strain gauge, and the effects of changes in humidity and the like are small. In this way, over a long period of time, the pushing force can be correctly detected, and accordingly, it can correctly be detected whether or not the webbing belt has been pulled out by a predetermined length or more.

In accordance with the buckle device recited in claim 5, the mounting piece of the plate spring serving as the urging means is fixed to the one of the anchor member and the device main body to which the force sensor is not mounted. Further, the plate spring has a plate portion, and this plate portion contacts the force sensor. When the urging force of the urging means exceeds the accommodating urging force and the device main body moves in the separating direction with respect to the anchor member, the plate spring elastically deforms. In this way, the pushing force, by which the plate portion pushes the force sensor, increases, and this increased pushing force is detected by the force sensor.

In the buckle device of claim 6, the long hole is formed in one of the anchor member and the device main body, and the through-hole is formed in the other, and the rivet passes through the long hole and the through-hole. Because the longitudinal direction of the long hole is along the aforementioned insertion direction and separating direction, the rivet can move from a state of contacting one end portion in the longitudinal direction of the long hole to a state of contacting the other end portion. In this way, in the present buckle device, the device main body can be connected so as to be displaceable over a predetermined range with respect to the anchor member along the insertion direction and the separating direction.

Further, in the present buckle device, the plate spring or the device main body is fixed on the rivet. In contrast, the one of the plate spring and the device main body which is not fixed on the rivet is fixed to the one of the anchor member and the device main body in which the long hole is formed.

When the rivet moves within the long hole when the urging force of the urging means exceeds the accommodating urging force and the device main body moves in the separating direction with respect to the anchor member, among the plate spring and the force sensor, the one which is fixed on the rivet approaches the one which is not fixed on the rivet. In this way, the pushing force, which the plate portion of the plate spring receives from the force sensor, increases, and accompanying this, the pushing force which the plate portion applies to the force sensor increases.

In accordance with the buckle device recited in claim 7, the mounting piece of the plate spring serving as the urging means is fixed to the one of the anchor member and the device main body to which the force sensor is not mounted. Further, the plate spring has a plate portion, and this plate portion contacts the force sensor. When the urging force of the urging means exceeds the accommodating urging force and the device main body moves in the separating direction with respect to the anchor member, the plate spring elastically deforms. In this way, the pushing force, by which the plate portion pushes the force sensor, increases, and this increased pushing force is detected by the force sensor.

In the buckle device of claim 8, the long hole is formed in one of the anchor member and the device main body, and the through-hole is formed in the other, and the rivet passes through the long hole and the through-hole. Because the longitudinal direction of the long hole is along the aforementioned insertion direction and separating direction, the rivet can move from a state of contacting one end portion in the longitudinal direction of the long hole to a state of contacting the other end portion. In this way, in the present buckle device, the device main body can be connected so as to be displaceable over a predetermined range with respect to the anchor member along the insertion direction and the separating direction.

Further, in the present buckle device, the plate spring or the device main body is fixed on the rivet. In contrast, the one of the plate spring and the device main body which is not fixed on the rivet is fixed to the one of the anchor member and the device main body in which the long hole is formed.

When the rivet moves within the long hole when the urging force of the urging means exceeds the accommodating urging force and the device main body moves in the separating direction with respect to the anchor member, among the plate spring and the force sensor, the one which is fixed on the rivet approaches the one which is not fixed on the rivet. In this way, the pushing force, which the plate portion of the plate spring receives from the force sensor, increases, and accompanying this, the pushing force which the plate portion applies to the force sensor increases.

In accordance with the buckle device recited in claim 9, the mounting piece of the plate spring serving as the urging means is fixed to the one of the anchor member and the device main body to which the force sensor is not mounted. Further, the plate spring has a plate portion, and this plate portion contacts the force sensor. When the urging force of the urging means exceeds the accommodating urging force and the device main body moves in the separating direction with respect to the anchor member, the plate spring elastically deforms. In this way, the pushing force, by which the plate portion pushes the force sensor, increases, and this increased pushing force is detected by the force sensor.

In the buckle device of claim 10, the long hole is formed in one of the anchor member and the device main body, and the through-hole is formed in the other, and the rivet passes through the long hole and the through-hole. Because the longitudinal direction of the long hole is along the aforementioned insertion direction and separating direction, the rivet can move from a state of contacting one end portion in the longitudinal direction of the long hole to a state of contacting the other end portion. In this way, in the present buckle device, the device main body can be connected so as to be displaceable over a predetermined range with respect to the anchor member along the insertion direction and the separating direction.

Further, in the present buckle device, the plate spring or the device main body is fixed on the rivet. In contrast, the one of the plate spring and the device main body which is not fixed on the rivet is fixed to the one of the anchor member and the device main body in which the long hole is formed.

When the rivet moves within the long hole when the urging force of the urging means exceeds the accommodating urging force and the device main body moves in the separating direction with respect to the anchor member, among the plate spring and the force sensor, the one which is fixed on the rivet approaches the one which is not fixed on the rivet. In this way, the pushing force, which the plate portion of the plate spring receives from the force sensor, increases, and accompanying this, the pushing force which the plate portion applies to the force sensor increases.

In accordance with the buckle device recited in claim 11, the mounting piece of the plate spring serving as the urging means is fixed to the one of the anchor member and the device main body to which the force sensor is not mounted. Further, the plate spring has a plate portion, and this plate portion contacts the force sensor. When the urging force of the urging means exceeds the accommodating urging force and the device main body moves in the separating direction with respect to the anchor member, the plate spring elastically deforms. In this way, the pushing force, by which the plate portion pushes the force sensor, increases, and this increased pushing force is detected by the force sensor.

In the buckle device of claim 12, the long hole is formed in one of the anchor member and the device main body, and the through-hole is formed in the other, and the rivet passes through the long hole and the through-hole. Because the longitudinal direction of the long hole is along the aforementioned insertion direction and separating direction, the rivet can move from a state of contacting one end portion in the longitudinal direction of the long hole to a state of contacting the other end portion. In this way, in the present buckle device, the device main body can be connected so as to be displaceable over a predetermined range with respect to the anchor member along the insertion direction and the separating direction.

Further, in the present buckle device, the plate spring or the device main body is fixed on the rivet. In contrast, the one of the plate spring and the device main body which is not fixed on the rivet is fixed to the one of the anchor member and the device main body in which the long hole is formed.

When the rivet moves within the long hole when the urging force of the urging means exceeds the accommodating urging force and the device main body moves in the separating direction with respect to the anchor member, among the plate spring and the force sensor, the one which is fixed on the rivet approaches the one which is not fixed on the rivet. In this way, the pushing force, which the plate portion of the plate spring receives from the force sensor, increases, and accompanying this, the pushing force which the plate portion applies to the force sensor increases.

BRIEF DESCRIPTION OF THE DRAWINGS

FIG. 6 is a perspective view summarily showing the structure at a proximal end side of a webbing belt.

FIG. 7 is a reverse surface view of the base forming the device main body.

PREFERRED EMBODIMENTS FOR IMPLEMENTING THE INVENTION

Embodiments of the Invention
<Structure of Present Embodiment>

Figure 1:
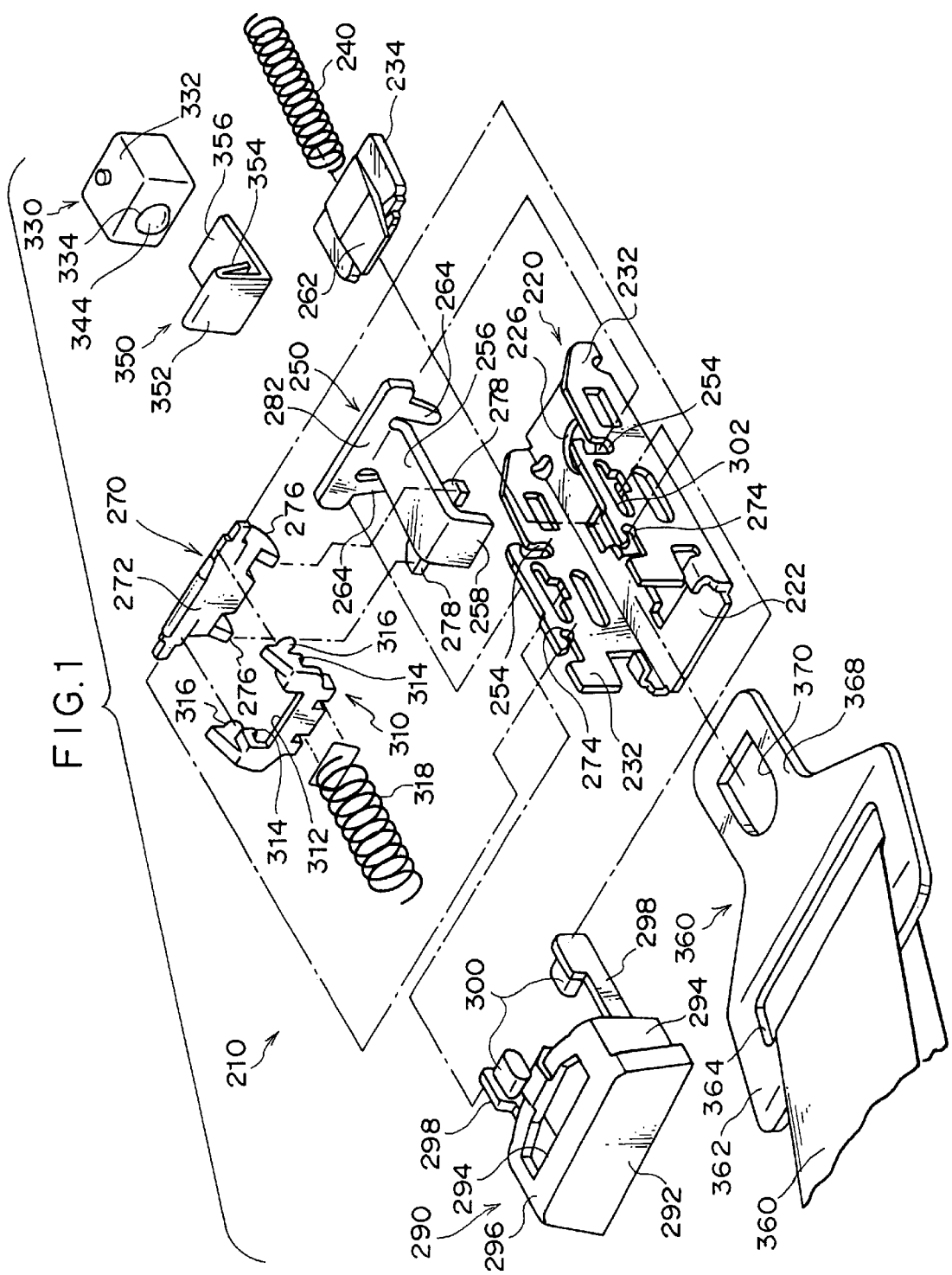
FIG. 1 is an exploded perspective view which schematically illustrates the structure of a buckle device relating to an embodiment of the present invention.

The structure of a buckle device 210 relating to an embodiment of the present invention is shown in exploded perspective view in FIG. 1. Further, the structure of the present buckle device 210 is shown in cross-sectional view in FIG. 2.

(Overall Structure of Buckle Device 210)

Figure 2:
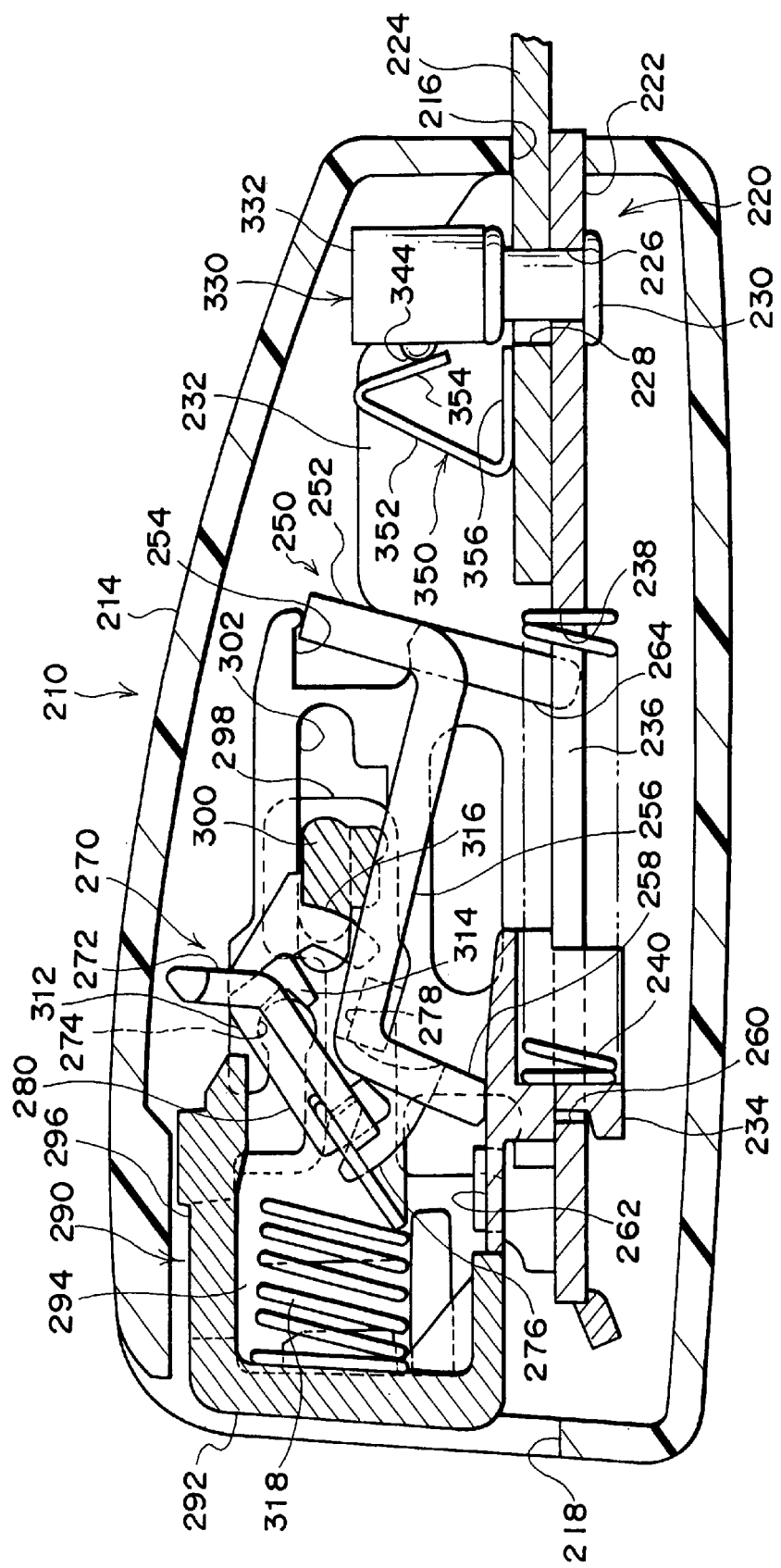
FIG. 2 is a cross-sectional view of the buckle device relating to the embodiment of the present invention.

As shown in FIG. 2, the buckle device 210 has a case 214. The case 214 is a box-shaped, tubular member whose both ends in the longitudinal direction are open. The opening at one end side in the longitudinal direction (pass-through direction) of the case 214 is an anchor insertion opening 216, and the opening at the other end side is a tongue insertion opening 218. Further, a base 220, which forms a device main body, is accommodated at the inner side of the case 214.

The base 220 has a flat-plate-shaped bottom plate 222 whose longitudinal direction runs along the longitudinal direction of the case 214. An anchor plate 224 is superposed on end side in the longitudinal direction of the bottom plate 222. A through-hole 226 is formed in the bottom plate 222 at the anchor insertion opening 216 side. A long hole 228 is formed in the anchor plate 224 in correspondence with the through-hole 226.

The transverse direction dimension of the inner diameter of the long hole 228 is substantially equal to the inner diameter dimension of the through-hole 226. In contrast, the longitudinal direction dimension of the inner diameter of the long hole 228 is sufficiently longer than the inner diameter dimension of the through-hole 226. Further, the longitudinal direction of the long hole 228 is substantially the same direction as the longitudinal direction of the bottom plate 222. Moreover, the long hole 228 is superposed on the through-hole 226 in the state in which the bottom plate 222 and the anchor plate 224 are superposed together. In the state in which the long hole 228 and the through-hole 226 are superposed together, a rivet 230 is passed through the long hole 228 and the through-hole 226. The bottom plate 222 and the anchor plate 224 are thereby mechanically connected.

Further, the other end side of the anchor plate 224 is fixed to the vehicle body at the side of a seat of the vehicle. The present buckle device 210 is thereby mounted to the vehicle.

On the other hand, as shown in FIG. 1, side walls 232 stand erect in the direction of thickness of the bottom plate 222 from both end portions in the transverse direction of the bottom plate 222. An ejector 234 is disposed between the side walls 232. A portion of the ejector 234 engages with a guide hole 236 formed in the bottom plate 222, and can slide over a predetermined range in the longitudinal direction of the bottom plate 222 along the guide hole 236.

Further, as shown in FIG. 7, an engagement projection 238 is formed to project from an end portion of the guide hole 236 at one side in the longitudinal direction of the bottom plate 222. One end of a compression coil spring 240 is anchored on the engagement projection 238. The other end of the compression coil spring 240 is pressed to contact one end of the ejector 234. Thus, the ejector 234 is urged toward the other end side in the longitudinal direction of the base plate 222 by the urging force of the compression coil spring 240.

On the other hand, as shown in FIG. 1 and FIG. 2, the buckle device 210 has a latch 250. The latch 250 has a base portion 252. Although it depends on the position of the latch 250, the base portion 252 is formed in a flat-plate shape whose longitudinal direction is substantially along the direction in which the both side walls 232 oppose one another and whose thickness direction is along the longitudinal direction of the bottom plate 222. The both end portions in the longitudinal direction of the base portion 252 enter into supporting holes 254 formed in the both side walls 232. The base portion 252 (i.e., the latch 250) is supported so as to be rotatable over a predetermined angle, with the longitudinal direction of the base portion 252 being the axial direction, until the base portion 252 is interfered with by the inner peripheral portions of the supporting holes 254.

A flat-plate-shaped connecting portion 256 extends toward one side in the transverse direction of the base portion 252, from one transverse direction end of the longitudinal direction intermediate portion of the base portion 252. Further, an engagement piece 258 extends toward the bottom plate 222 from the side of the connecting portion 256 opposite the base portion 252.

The distal end portion of the engagement piece 258 (more specifically, the end portion at the side opposite the portion connected to the connecting portion 256) corresponds to a pass-through hole 260 formed in the bottom plate 222. Thus, due to the latch 250 being displaced, the engagement piece 258 can enter into the pass-through hole 260.

A placement piece 262 is provided integrally with one thickness direction surf ace (at the side opposite the bottom plate 222) of the aforementioned ejector 234, so as to correspond to the distal end portion of the engagement piece 258 of the latch 250. As described above, the urging force of the compression coil spring 240 is applied to the ejector 234. However, the placement piece 262 subs tantially is provided so as to oppose the distal end portion of the engagement piece 258 along the direction of thickness of the bottom plate 222, in a state in which the ejector 234 is positioned at a reached position in a state in which basically no external force other than the urging force of the compression coil spring 240 is applied. In this state, the placement piece 262 interferes with the distal end portion of the engagement piece 258, and restricts movement of the engagement piece 258 (i.e., movement of the latch 250) in the direction of approaching the bottom plate 222.

Further, stoppers 264 extend from the both end sides in the longitudinal direction of the base portion 252. The stoppers 264 are formed such that the distal end sides thereof are positioned on the locus of sliding of the ejector 234 against the urging force of the compression coil spring 240. Thus, when the ejector 234 slides a predetermined distance against the urging force of the compression coil spring 240, the ejector 234 abuts the stoppers 264.

Moreover, a lock member 270 is disposed at the side of the connecting portion 256 opposite the side at which the bottom plate 222 is disposed. The lock member 270 has a base portion 272. The base portion 272 is a substantially square rod shape whose longitudinal direction is along the direction in which the both side walls 232 oppose one another.

Both end portions of the base portion 272 enter into engagement holes 274 formed in the both side walls 232. The engagement holes 274 are formed further toward the longitudinal direction other end sides of the side walls 232 than the pass-through hole 260. The base portion 272 is supported at the side walls 232 so as to be rotatable around its own longitudinal direction. A pair of lock pieces 276 are formed at both end sides in the longitudinal direction of the base portion 252. Each lock piece 276 is formed in a substantial fan shape. Further, the lock pieces 276 correspond to abutment pieces 278 which extend out from the both end portions in the transverse direction of the connecting portion 256, and the lock pieces 276 abut the abutment pieces 278.

Further, an abutment portion 280 is formed at the intermediate portion in the longitudinal direction of the base portion 272. The abutment portion 280 abuts the engagement piece 258 in the state in which the engagement piece 258 of the latch 250 is set apart from the bottom plate 222.

On the other hand, the buckle device 210 has a release button 290. The release button 290 has a pushing portion 292 for operation. The pushing surface of the pushing portion 292 is a plate shape which is directed toward the other end side in the longitudinal direction of the bottom plate 222, and the longitudinal direction of the pushing portion 292 is along the direction in which the both side walls 232 oppose one another.

Side walls 294 extend out toward the one end side in the longitudinal direction of the bottom plate 222, from vicinities of the both ends in the longitudinal direction of the pushing portion 292. These side walls 294 oppose one another along the direction in which the aforementioned side walls 232 oppose one another. Further, the end portions of the side walls 294 at the side opposite the bottom plate 222 are connected by an upper wall 296. In this way, the pushing portion 292 is formed overall in a concave shape which opens toward the bottom plate 222.

Arms 298 extend out from the end portions of the both side walls 294 at the side opposite the pushing portion 292. The arms 298 are formed so as to oppose one another along the direction in which the side walls 294 oppose one another.

An engagement projection 300 is formed at the distal end portion of each arm 298 so as to project toward the other opposing arm 298. These engagement projections 300 enter into guide holes 302 formed in the side walls 232.

The guide holes 302 are long holes whose longitudinal directions are along the longitudinal direction of the bottom plate 222. Due to the engagement projections 300 contacting the inner peripheral portions of the guide holes 302, the engagement projections 300 are displaceable over a predetermined range along the longitudinal direction of the bottom plate 222. In this way, the direction of movement of the release button 290 is restricted to the longitudinal direction of the bottom plate 222.

Further, a stopper 310 is disposed between the pushing portion 292 and the lock member 270. The stopper 310 has a base portion 312. The base portion 312 is formed as a plate shape whose longitudinal direction runs along the direction in which the side walls 294 oppose one another. A pair of engagement pieces 314 are formed at the both end sides in the longitudinal direction of the base portion 312.

The engagement pieces 314 are formed in concave shapes which are open toward the bottom plate 222 when viewed along the longitudinal direction of the base portion 312. Further, these engagement pieces 314 engage with the base portion 272 of the above-described lock member 270. In this way, the stopper 310 is supported at the lock member 270.

Moreover, interfering portions 316 are formed in vicinities of the both engagement pieces 314 of the stopper 310. The interfering portions 316 can interfere with the engagement projections 300 of the above-described release button 290.

Further, a compression coil spring 318 is disposed between the stopper 310 and the pushing portion 292 of the release button 290. One end of the compression coil spring 318 abuts the side of the pushing portion 292 opposite the pushing surface. In contrast, the other end of the compression coil spring 318 abuts the base portion 312 of the stopper 310. Due to the urging force of the compression coil spring 318, the stopper 310 is urged in a direction of moving away from the pushing portion 292.

Figure 5:
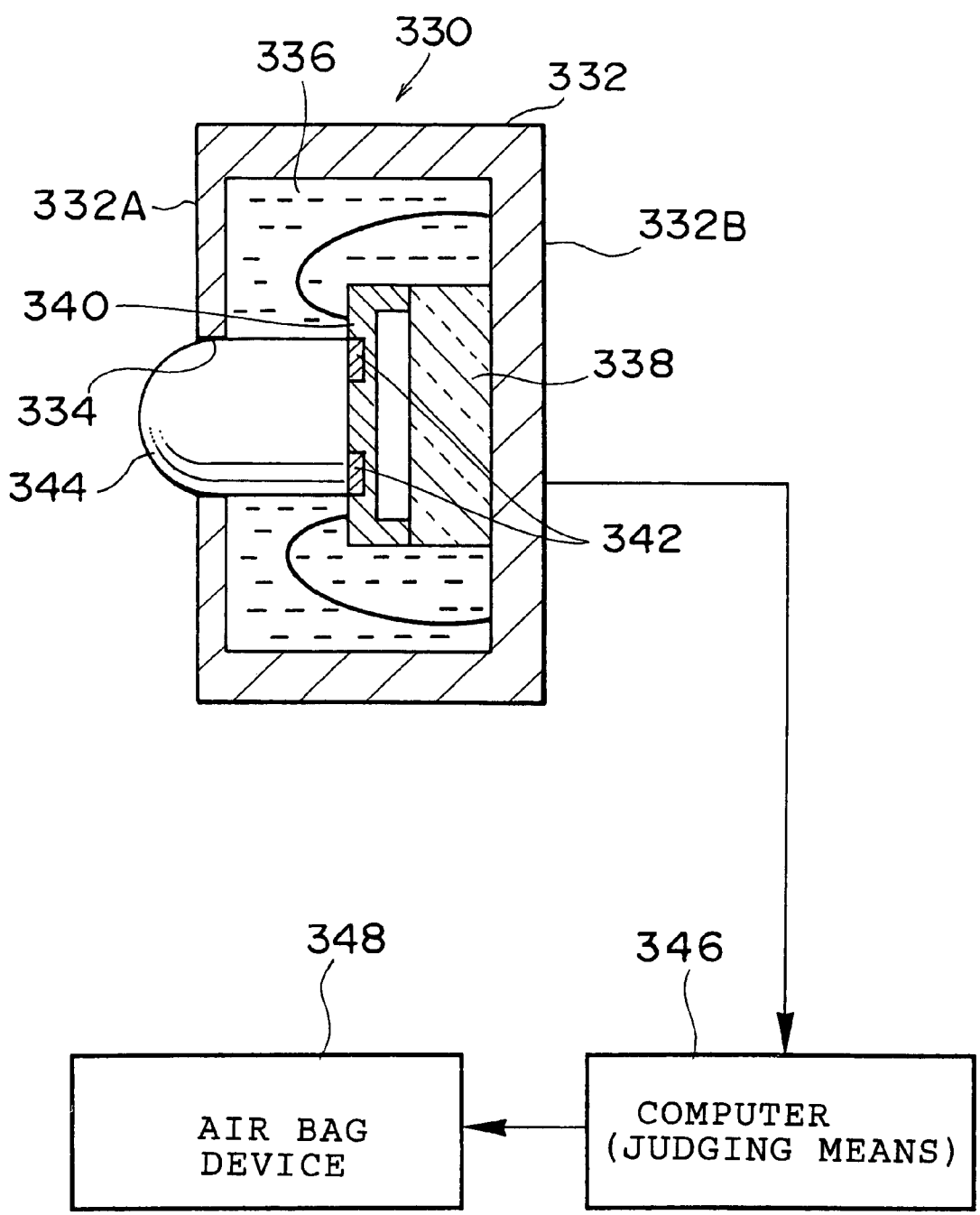
FIG. 5 is a cross-sectional view summarily showing the structure of a force sensor.

On the other hand, the present buckle device 210 is provided with a force sensor 330 serving as a detecting means. Here, the schematic structure of the force sensor 330 is illustrated in FIG. 5.

As shown in this figure, the force sensor 330 has a case 332. The case 332 is basically formed in a substantial box-shape. As shown in FIG. 2, the case 332 is fixed on the rivet 230. Moreover, as shown in FIG. 5, a hole 334 is formed in a side wall 332A which is positioned at the tongue insertion opening 218 side, among the side walls forming the case 332. The interior and exterior of the case 332 communicate through this hole 334.

A pedestal 338 is accommodated at the inner side of the case 332. The pedestal 338 is formed in a plate shape or a block shape by glass or the like. Further, the pedestal 338 is fixed to a side wall 332B which opposes the side wall 332A. Moreover, a diaphragm 340 is fixed to the surface, at the side wall 332A side, of the pedestal 338.

The diaphragm 340 is formed by subjecting a silicon chip or the like to etching or the like. In this way, the diaphragm 340 has a concave cross-sectional configuration which opens toward the side wall 332B side. Semiconductor diffusion strain gauges 342, which serve as strain gauges, are fixed to the surface, at the side wall 332A side, of the diaphragm 340.

In the present embodiment, there is a structure in which the semiconductor diffusion strain gauges 342 are applied as strain gauges. However, in place of such semiconductor diffusion strain gauges 342, other semiconductor strain gauges, such as a bulk type or a vapor deposition type or the like, may be applied. Further, other strain gauges, such as metal strain gauges or the like, and not semiconductor strain gauges may be applied.

A transfer rod 344 is provided at the side wall 332A side of the diaphragm 340. The transfer rod 344 is formed of glass or the like and in a rod-shape having a circular cross-section. Further, the longitudinal direction of the transfer rod 344 is along the direction in which the side wall 332A and the side wall 332B oppose one another. Moreover, one longitudinal direction end of the transfer rod 344 contacts the diaphragm 340 and the semiconductor diffusion strain gauges 342.

In contrast, the other end portion in the longitudinal direction of the transfer rod 344 is formed in a substantially hemispherical shape. Further, the other end side in the longitudinal direction of the transfer rod 344 passes through the hole 334 and projects to the exterior of the case 332.

When external force directed toward the one end side from the longitudinal direction other end side of the transfer rod 344 is applied to the transfer rod 344 from the exterior of the case 332, the transfer rod 344 pushes the diaphragm 340 and the semiconductor diffusion strain gauges 342. Due to this pushing, the diaphragm 340 deflects slightly, and further, the semiconductor diffusion strain gauges 342 deflect. In this way, the dimensions of the resistance foil or the like forming the semiconductor diffusion strain gauges 342 change, and the electrical resistance value changes. The magnitude of the force applied to the diaphragm 340 is detected on the basis of this change in the electrical resistance value.

Further, a silicone gel 336 serving as a sealing means is provided at the interior of the case 332. The pedestal 338, the diaphragm 340, and the semiconductor diffusion strain gauges 342 are enclosed in the silicone gel 336. The silicone gel 336 is a so-called gel-like member, and has viscosity to the extent that it does not impede the displacement (deflecting) of the sealed diaphragm 340 and semiconductor diffusion strain gauges 332.

In this way, because the pedestal 338, the diaphragm 340, and the semiconductor diffusion strain gauges 342 are sealed in the silicone gel 336, foreign matter entering into the case 332 from the hole 334 can be prevented from directly contacting the diaphragm 340 and the semiconductor diffusion strain gauges 342.

Moreover, by sealing the pedestal 338, the diaphragm 340, and the semiconductor diffusion strain gauges 342 in the silicone gel 336, the effects of changes in the humidity and the like of the exterior of the case 332 on the diaphragm 340 and the semiconductor diffusion strain gauges 342 can be made small or can be eliminated. In this way, over a long period of time, the diaphragm 340 can be reliably and correctly deflected, and the semiconductor diffusion strain gauges 342 can reliably detect the deflecting of the diaphragm 340.

On the other hand, as shown in FIG. 5, the semiconductor diffusion strain gauges 342 are electrically connected to a computer 346 serving as a judging means. An electric signal outputted from the semiconductor diffusion strain gauges 342 is inputted to the computer 346. The magnitude or the like of the electric signal corresponds to the pressure applied to the semiconductor diffusion strain gauges 342. At the computer 346, the magnitude of the pressure applied to the semiconductor diffusion strain gauges 342 is computed on the basis of the inputted electric signal, or it is judged whether the pressure is greater than or equal to a predetermined value.

Further, the computer 346 is connected to an air bag device 348. When an acceleration sensor or the like detects a state of rapid deceleration of the vehicle, the air bag device 348 operates a gas generating means. Due to the gas generating means operating, a large amount of gas is instantaneously generated. The gas generated by the gas generating means is supplied to the interior of a bag body which is in a folded-up state. Due to the gas pressure, the bag body expands and unfolds toward the front or the side of the vehicle occupant.

The computer 346 is structured so as to control the gas generating means of the air bag device 348 either directly or indirectly.

On the other hand, as shown in FIGS. 1 and 2, a plate spring 350 serving as an urging means is provided at the side of the case 332. The plate spring 350 has a plate-shaped plate portion 354. The plate portion 354 is provided so as to oppose the side wall 332A, and always contacts the other longitudinal direction end portion of the transfer rod 344.

Further, the plate spring 350 has a plate portion 352. The plate portion 352 is connected, at the upper end portion thereof, to the plate portion 354. The plate portion 352 and the plate portion 354 are formed by bending a single metal plate member. Due to the plate portion 354 being rotated with respect to the plate portion 352 around the connecting portion with the plate portion 352 (the upper end portion), urging force in a direction opposite to the direction of this rotation is generated.

Accordingly, due to the plate portion 354 rotating in the direction of approaching the plate portion 352, urging force F1 toward the transmission rod 344 is generated. This urging force F1 is larger than an accommodating urging force F2 (hereinafter, the accommodating urging force F2 will simply be called "urging force F2") generated at a spiral spring 388 at the time when a webbing belt 366 is pulled out by the length needed at the time of restraining the body of the vehicle occupant, from a spool 382 of a webbing retractor 380 which will be described later. Further, the urging force F1 is smaller than the urging force F2 at the time when the webbing belt 366 is pulled out by the length needed at the time of fixing a child seat, which will be described later, to the seat.

Further, a mounting piece 356 extends out from the lower end portion of the plate portion 352 (i.e., from the end portion at the side opposite the portion connected to the plate portion 354), and is fixed on the anchor plate 224.

Figure 3:
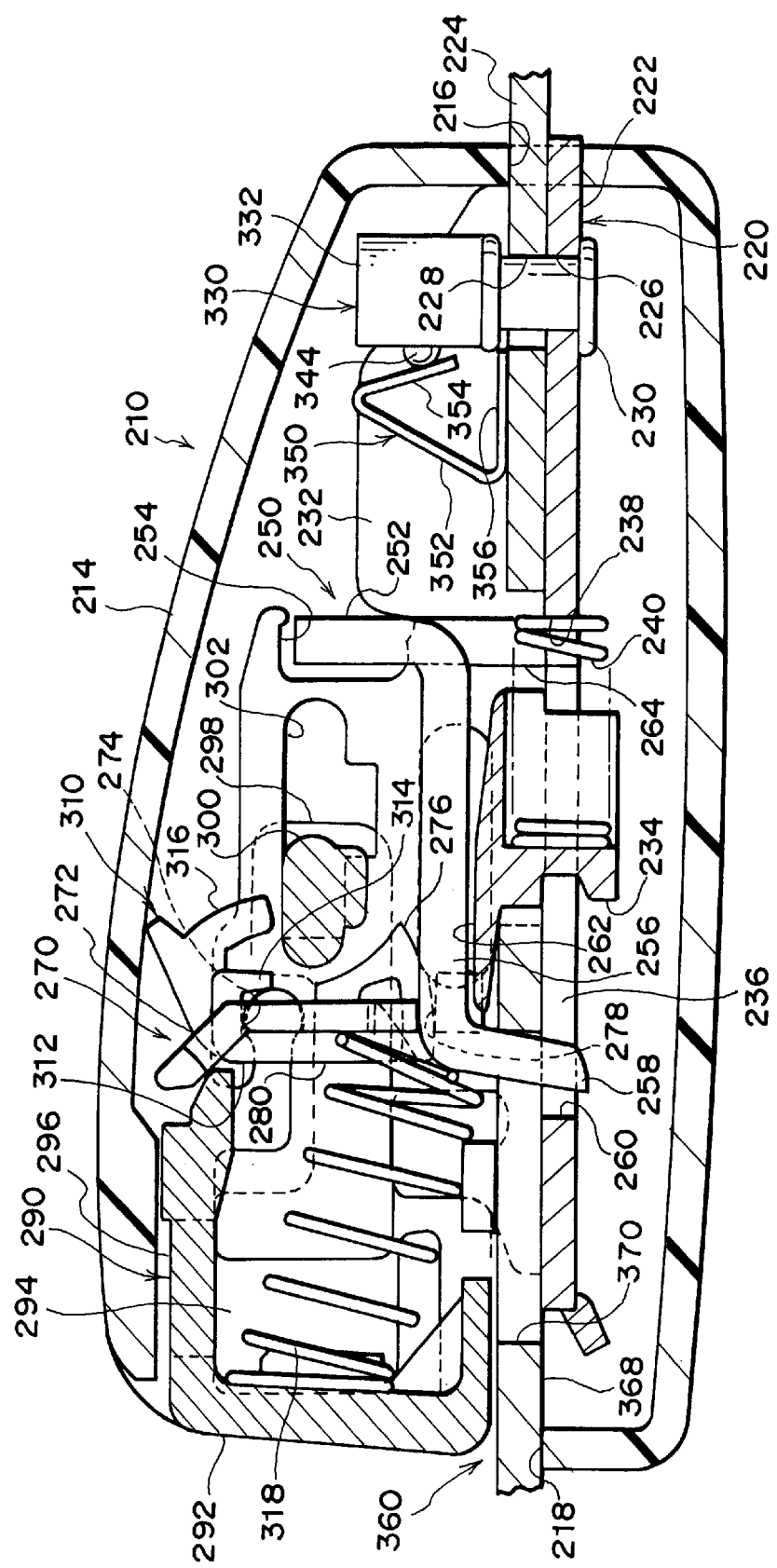
FIG. 3 is a cross-sectional view, corresponding to FIG. 2, of a state in which a latch is engaged with a tongue plate.

As shown in FIG. 3, a tongue plate 360, which together with the buckle device 210 forms a seat belt device for a vehicle, is inserted into the inner side of the buckle device 210 having the above-described structure. As shown in FIGS. 1 and 3, the tongue plate 360 has a tongue main body 362 which is formed as a flat plate and from a hard metal material or the like. An insertion plate portion 368 extends out from the tongue main body 362. The insertion plate portion 368 is inserted from the tongue insertion opening 218 of the case 214. A substantially rectangular engagement hole 370 is formed in the insertion plate portion 368. When the insertion plate portion 368 is inserted to a predetermined position within the case 214 from the tongue insertion opening 218, the engagement hole 370 is superposed with the pass-through hole 260. Thus, in the state in which the engagement hole 370 is superposed with the pass-through hole 260, when the latch 250 rotates, the engagement piece 258 passes through the engagement hole 370 and the pass-through hole 260.

On the other hand, a slit hole 364 is formed in the tongue main body 362. The elongated, strip-shaped webbing belt 366 is inserted through the slit hole 364.

The distal end portion of the webbing belt 366 is anchored on an outer anchor which is fixed to the vehicle body or to the seat, at the side of the vehicle seat opposite the side at which the buckle device 210 is provided. In contrast, as shown in FIG. 6, the proximal end portion in the longitudinal direction of the webbing belt 366 is attached to the webbing retractor 380.

The webbing retractor 380 has the spool 382 which serves as a take-up shaft. The spool 382 has a main body portion which is substantially hollow cylindrical or substantially solid cylindrical. The spool 382 is supported either directly or indirectly at a leg plate 384 of a frame, and rotates freely around the axis of the main body portion of the spool 382.

Due to the spool 382 rotating in one take-up direction around its own axis, the spool 382 takes up the webbing belt 366, from the proximal end side thereof, onto the outer peripheral portion. Further, due to the webbing belt 366 being pulled toward the distal end side thereof, the spool 382 rotates in the direction opposite to the take-up direction while the webbing belt 366 is pulled-out from the spool 382.

A case 386 is mounted to the leg plate 384 of the frame. The case 386 is formed in a substantial box shape which opens toward the leg plate 384. The spiral spring 388 serving as an accommodating urging means is accommodated at the interior of the case 386. The end portion of the spiral spring 388 at the outer side in the direction of the spiral thereof is anchored on the case 386. In contrast, the end portion of the spiral spring 388 at the inner side in the direction of the spiral thereof is anchored on the spool 382 which has passed through the leg plate 384 and entered into the case 386.

The spiral spring 388 is wound tightly by rotating the spool 382 in the pull-out direction. In this way, the spiral spring 388 applies the urging force F2 in the take-up direction to the spool 382. Further, as the amount of rotation in the pull-out direction of the spool 382 increases, the urging force F2 of the spiral spring 388 increases.

<Operation and Effects of the Present Embodiment>

Next, the operation and effects of the present embodiment will be described.

(Basic Operation of Buckle Device 210)

First, the basic operation of the present buckle device 210 will be described.

In a seat belt device which is structured so as to include the present buckle device 210, when a vehicle occupant seated in a vehicle seat is to apply the webbing belt 366, or when a child seat is to be fixed on the seat by the webbing belt 366, first, the tongue plate 360 is grasped and the webbing belt 366 is pulled. By pulling the webbing belt 366, the distal end side of the webbing belt 366, which is accommodated in a state of being taken-up on the outer peripheral portion of the spool 382, is pulled out.

As shown in FIG. 3, the insertion plate portion 368 of the tongue plate 360 is inserted from the tongue insertion opening 218 of the case 214 while the webbing belt 366 is pulled out in this way. In this state, as shown in FIG. 3, the distal end portion of the insertion plate portion 368 abuts and presses the end portion of the ejector 234, and the ejector 234 is slid toward the one end side in the longitudinal direction of the bottom plate 222 against the urging force of the compression coil spring 240.

When the ejector 234 slides by a predetermined amount toward the one end side in the longitudinal direction of the bottom plate 222, the state in which the placement piece 262 of the ejector 234 and the engagement piece 258 of the latch 250 oppose one another is cancelled. Further, the ejector 234 presses the stopper 264 of the latch 250, and rotates the latch 250.

In this way, the distal end portion of the engagement piece 258 moves to approach the bottom plate 222. Further, in this state, the engagement hole 370 of the insertion plate portion 368 and the pass-through hole 260 formed in the bottom plate 222 are superposed together. Accordingly, in this state, as shown in FIG. 3, the rotated engagement piece 258 passes through the engagement hole 370 (the insertion plate portion 368) and the pass-through hole 260 (the bottom plate 222).

Further, when the latch 250 rotates, the state in which the engagement piece 258 and the abutment portion 280 of the lock member 270 are abutting is cancelled. The lock pieces 276 receive the urging force of the compression coil spring 318 via the stopper 310. Thus, the lock member 270 rotates due to the urging force of the compression coil spring 318 and interlocking with the rotation of the latch 250, and the lockpieces 276 abut the abutment pieces 278 of the latch 250.

In this way, rotation of the latch 250 is restricted to the direction in which the engagement piece 258 moves away from the bottom plate 222. In this way, due to rotation of the latch 250 being restricted, the tongue plate 360 is set in a state of being attached to the buckle device 210. In this state, if the webbing belt 366 is applied to the body of the vehicle occupant seated in the seat, a state arises in which the body is restrained by the webbing belt 366. In contrast, in this state, if a child seat is fixed on the seat by the webbing belt 366, a state arises in which the child seat is attached.

(Characteristic Operation and Effects of the Present Embodiment)

On the other hand, when the webbing belt 366 is pulled out, the spool 382 rotates in the pull-out direction in accordance with the amount by which the webbing belt 366 is pulled out. In this way, when the spool 382 rotates in the pull-out direction, the spiral spring 388 is wound tightly, and the urging force F2 which is the accommodating urging force increases. This urging force F2 is applied to the tongue plate 360 via the webbing belt 366, and attempts to pull the tongue plate 360 out from the case 214. Moreover, the urging force F2, via the tongue plate 360 and the latch 250, pulls the base 220 toward the tongue insertion opening 218 side (i.e., in the direction of separating). Thus, the base 220 can be displaced, by the accommodating urging force, in the direction of separating, until the rivet 230 contacts the separating direction side end portions of the long holes 228, 416.

However, at the present buckle device 210, the plate spring 350 urges the base 220 toward the anchor insertion opening 216 side with respect to the anchor plate 224. Thus, provided that the urging force F1 of the plate spring 350 exceeds the urging force F2, the base 220 is held by the urging force F1 of the plate spring 350 at the position at which the rivet 230 contacts the insertion direction side end portion of the long hole 228.

Figure 4:
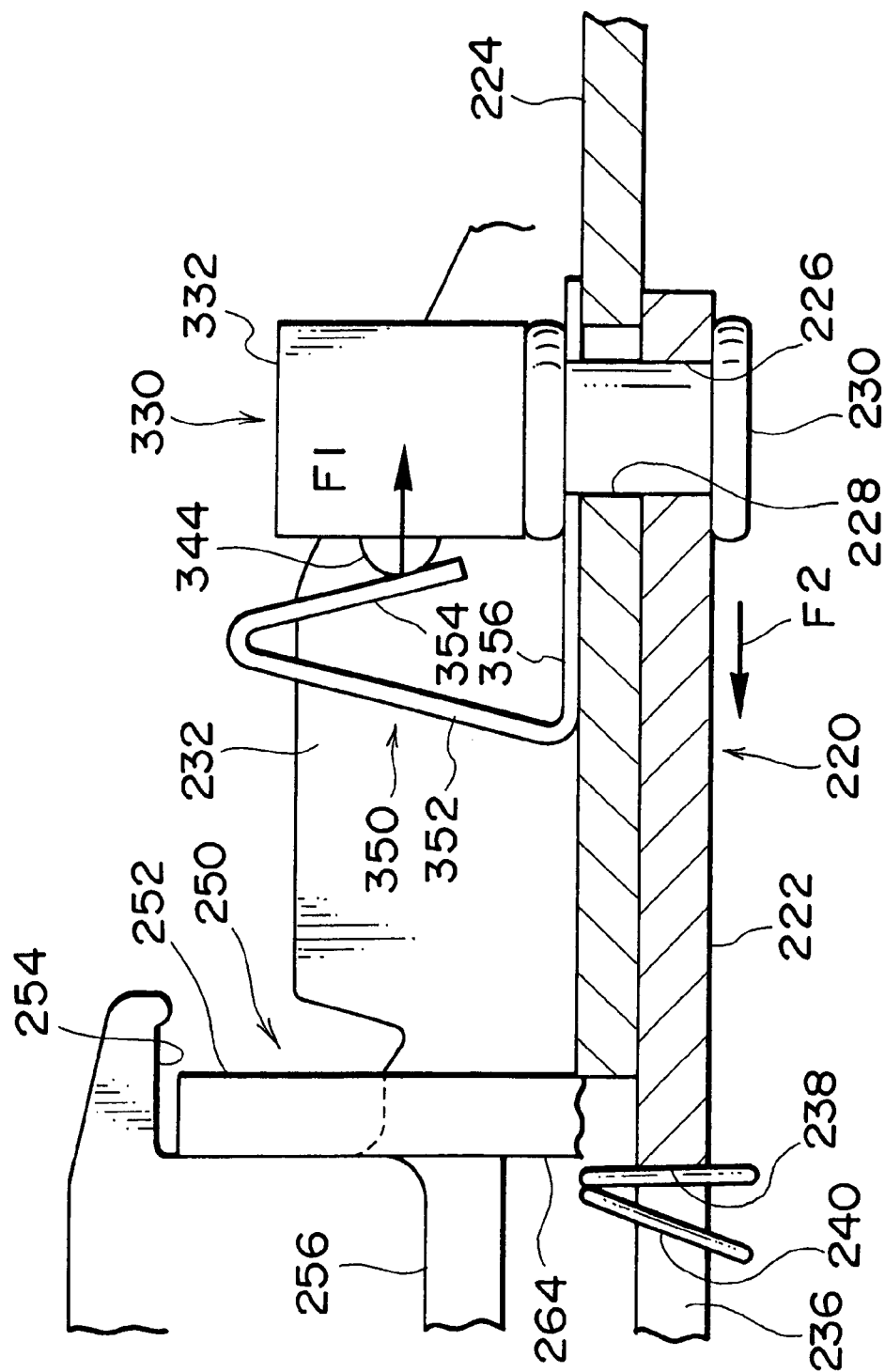
FIG. 4 is a cross-sectional view of main portions, showing a state in which a device main body (base) has moved relatively to an anchor member (anchor plate).

Here, comparing the above-described state in which the body is restrained and the state in which a child seat is attached, the urging force F2 is larger in the state in which a child seat is attached, and the urging force F2 exceeds the urging force F1. Accordingly, in the state in which a child seat is attached, as shown in FIG. 4, against the urging force F1 of the plate spring 350, the urging force F2 displaces the base 220 toward the separating direction side until the rivet 230 contacts the separating direction side end portions of the long holes 228, 416.

When the base 220 is displaced in this way, the case 332 of the force sensor 330, which is fixed to the rivet 230, also is displaced integrally. In this way, when the case 332 is displaced relatively toward the separating direction side with respect to the anchor plate 224 by a predetermined amount or more, the one longitudinal direction end portion of the transfer rod 344 pushes the plate portion 354 of the plate spring 350. The plate portion 354 which is pushed by the transfer rod 344 is elastically displaced in a direction of approaching the plate portion 352. Due to the restoring force generated at the plate spring 350 by this displacement, the plate portion 354 attempts to push the transfer rod 344 in toward the inner side of the case 332.

The restoring force of the plate spring 350, which is applied to the transfer rod 344 in this way, is applied to the diaphragm 340 via the transfer rod 344, and the diaphragm 340 is deflected. This deflecting of the diaphragm 340 is detected by the semiconductor diffusion strain gauges 342, and a predetermined load detection signal is outputted from the semiconductor diffusion strain gauges 342. The load detection signal outputted from the semiconductor diffusion strain gauges 342 is inputted to the computer 346.

At the computer 346, the signal level, such as the magnitude of the voltage or the like, of the inputted load detection signal is compared with a reference value set in advance or the like, and it is judged whether or not the signal level of the load detection signal exceeds a predetermined signal level, i.e., whether or not the base 220 has moved with respect to the anchor plate 224 (in other words, it is judged whether or not a child seat has been attached on the seat). When the computer 346 judges that a child seat has been attached onto the seat, the air bag device 348 is set, by the computer 346, in a state in which operation is not possible. In this way, operation of the air bag device 348 in a state in which a child seat is attached to the seat can be stopped.

Here, in the present embodiment, the difference between the tension, which is applied to the webbing belt 366 in the state in which a child seat is attached, and the tension, which is applied to the webbing belt 366 in the ordinary state in which the webbing belt is applied, is utilized. Therefore, this difference is expressed relatively markedly. Thus, the reliability is high as compared with a conventional structure which judges on the basis of the load applied to the seat.

Further, the buckle device 210 itself of course has the function of a conventional buckle device for a seat belt device. Accordingly, it suffices to set the present buckle device 210 in the space at which a buckle device for a seat belt device has been conventionally set, and there is no need for a special space for setting a child seat detecting mechanism. As a result, the limited space within the vehicle interior can be utilized efficiently.

Moreover, in the present embodiment, the force sensor 330, which is structured so as to include the semiconductor diffusion strain gauges 342, is applied to the detecting means. Here, generally, the electrical resistance value of the semiconductor diffusion strain gauge 342 varies linearly with respect to changes in the pushing force applied to the semiconductor diffusion strain gauge 342. Thus, it is possible to detect the pulled-out amount of the webbing belt 366, provided that it is a predetermined length or greater. In this way, for example, it can be applied not only to detection of a child seat, but also to various types of controls and the like, such as control of a so-called pretensioner mechanism or a force limiter or the like. Furthermore, it can be applied to a plurality of different controls, and various detections and controls are possible at a low cost.

INDUSTRIAL APPLICABILITY

As described above, the buckle device relating to the present invention can be utilized not only as a buckle device forming a seat belt device for a vehicle, but also as the buckle device of a seat belt device for structures other than vehicles, without limiting the concrete modes of the seat belt device.

What is claimed is:

1. A buckle device holding a tongue plate mounted to an elongated, strip-shaped webbing belt which is taken-up and accommodated from a proximal end side toward an accommodating direction side which is opposite to a pull-out direction, by an accommodating urging force which increases and decreases in accordance with an amount by which the webbing belt is pulled out toward a pull-out direction side, said buckle device comprising:

a device main body into which the tongue plate is inserted from a distal end side;

a latch which is provided at the device main body so as to be movable so as to approach and move away from the tongue plate inserted in the device main body, and which, by moving to approach the tongue plate, mechanically engages with the tongue plate, and limits movement of the tongue plate in a separating direction which is opposite to an insertion direction into the device main body;

an anchor member which is mounted to a predetermined position of a vehicle, and which supports the device main body such that the device main body is relatively movable in a predetermined range in the insertion direction and the separating direction;

urging means for urging the device main body in the insertion direction with respect to the anchor member, by urging force which is greater than the accommodating urging force in a state in which the webbing belt is pulled out by a predetermined length;

a force sensor which is mounted to one of the anchor member and the device main body, and which outputs a load detection signal which is based on pushing force applied from one of the insertion direction and the separating direction; and a pushing member applying pushing force to the force sensor in accordance with relative movement of the device main body in the separating direction with respect to the anchor member.

2. The buckle device of claim 1, wherein the force sensor has a strain gauge whose electrical resistance value varies in accordance with application of external force and cancellation of applied external force, and, on the basis of a change in the electrical resistance value, the force sensor detects one of that the pushing force is applied and that application of the pushing force is cancelled.

3. The buckle device of claim 2, wherein the force sensor has:

a case accommodating a diaphragm to which the strain gauge is mounted; and a transfer rod whose proximal end contacts the diaphragm, and whose other end side projects from a hole formed in a side wall of the case, and which receives the pushing force at an exterior of the case, and the transfer rod, which has received the pushing force, one of pushes the strain gauge directly and pushes the strain gauge indirectly via the diaphragm.

4. The buckle device of claim 3, wherein the force sensor has a gel-like sealing means which is provided at an interior of the case and which seals the strain gauge at an interior.

5. The buckle device of claim 4, wherein a plate spring is the urging means and the pushing member, and the plate spring is structured so as to include:

a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

6. The buckle device of claim 5, further comprising a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

7. The buckle device of claim 1, wherein a plate spring is the urging means and the pushing member, and the plate spring is structured so as to include:

a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

8. The buckle device of claim 7, further comprising a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

9. The buckle device of claim 2, wherein a plate spring is the urging means and the pushing member, and the plate spring is structured so as to include:

a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

10. The buckle device of claim 9, further comprising a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

11. The buckle device of claim 3, wherein a plate spring is the urging means and the pushing member, and the plate spring is structured so as to include:

a mounting piece fixed to one of the anchor member and the device main body to which the force sensor is not mounted; and a plate portion formed integrally with the mounting piece and pressed into contact with the force sensor, and due to relative movement of the device main body in the separating direction with respect to the anchor member, pushing force which the plate portion applies to the force sensor increases.

12. The buckle device of claim 11, further comprising a rivet which passes through a long hole, whose longitudinal direction is along the insertion direction and the separating direction and which is formed in one of the anchor member and the device main body, and a through-hole, which is formed in another of the anchor member and the device main body, and the device main body is connected by the rivet so as to be movable with respect to the anchor member along the insertion direction and the separating direction, and one of the plate spring and the force sensor is fixed on the rivet, and one of the plate spring and the force sensor which is not fixed on the rivet is fixed to the one of the anchor member and the device main body in which the long hole is formed.

* * * * *